(12) United States Patent
Hecker (10) Patent No.: US 11,080,580 B2
(45) Date of Patent: Aug. 3, 2021

(54) CHIP-BASED CARD SECURITY

(71) Applicant: NCR Corporation, Atlanta, GA (US)

(72) Inventor: Weston Lee Hecker, Bismarck, ND (US)

(73) Assignee: NCR Corporation, Atlanta, GA (US)

( * ) Notice: Subject to any disclaimer, the term of this patent is extended or adjusted under 35 U.S.C. 154(b) by 239 days.

(21) Appl. No.: 16/227,887

(22) Filed: Dec. 20, 2018

(65) Prior Publication Data

US 2020/0202190 A1    Jun. 25, 2020

(51) Int. Cl.
  *G06K 19/07*    (2006.01)
(52) U.S. Cl.
  CPC ..................... *G06K 19/07* (2013.01)
(58) Field of Classification Search
  CPC .................. G06K 19/07; G06K 19/07309
  See application file for complete search history.

(56) References Cited

U.S. PATENT DOCUMENTS

| | | | | |
|---|---|---|---|---|
| 8,624,740 B2 * | 1/2014 | Sweeney | .......... | G06K 19/07345 340/572.7 |
| 2004/0124248 A1 * | 7/2004 | Selker | .............. | G06K 19/07749 235/492 |
| 2008/0037482 A1 * | 2/2008 | Douglas | ................ | H04W 24/00 370/338 |
| 2014/0108241 A1 * | 4/2014 | Tunnell | ................ | G06Q 20/363 705/41 |
| 2017/0046608 A1 * | 2/2017 | Narendra | ................ | G06K 7/065 |
| 2018/0357644 A1 * | 12/2018 | Tabe | ................ | G06Q 20/40145 |

* cited by examiner

*Primary Examiner* — Sonji N Johnson
(74) *Attorney, Agent, or Firm* — Schwegman, Lundberg & Woessner (57) ABSTRACT

A chip-based card is provided with on-card security. The card in a non-activated state is fully resistant to any power received from a card reader, such that a chip in the card is unable to be powered on by the card reader when the card is inserted to the card reader for a transaction. A plurality of pressure contact points are provided on the card. When a correct number of correct pressure points are pinched by a card holder before insertion of the card into the card reader, a custom amount of resistance is removed such that a custom amount of voltage is capable of being received from the card reader for powering up the chip. In an embodiment, the customized voltage drives firmware execution on a processor of the chip to produce customized output for the transaction.

17 Claims, 8 Drawing Sheets

CHIP-BASED CARD SECURITY

BACKGROUND

Chip-based payment cards have been mandated in the industry. It is believed that a chip-based card provides superior security because a transaction is only valid when the chip on the card is powered on and communicating with the card reader.

When inserted into a card reader, the card reader supplies power to the on-card chip from a predefined pin location of the card. Once powered on, the chip is able to provide data back to the card reader through other designated pin locations on the chip, such as a unique transaction code/token for a transaction that is needed by a host system to validate the card as a form of payment for a transaction at a transaction terminal.

Typically, the chip includes a secret only known by the card issuer that is embedded in the chip. When a transaction occurs and the card reader powers on the chip, a random challenge is sent for the transaction from the terminal that is relevant to the transaction. The chip produces a unique cryptographic response based on its secret, the random transaction-specific challenge, and any Person Identification Number (PIN) entered by the user. This response is then validated by the host system (card issuer) and authorization is provided back to the transaction terminal indicating payment for the transaction is authorized.

However, this process is still susceptible to network-based Euro pay Master® and Visa® (EMV) relay attacks. In an EMV relay attack the terminal or software processing on the terminal is infected with malicious code, such that when the user enters the card into the card reader a random challenge for a much higher transaction taking place on an entirely different terminal is sent to the card as the random challenge. The token response from the card provides authorization for the higher priced transaction occurring at a remote network location. The card issuer's host system sees the nefarious transaction as legitimate based on the response from the card so the higher priced transaction is authorized and thieves have successfully breached the account security of the card without having possession of the card.

Another type of security breach that chip-based cards are susceptible to is a downgrade attack. In a downgrade attack, the reader/terminal is switched from a chip-based mode to a magnetic stripe mode of operation where no response or challenge are used. The card can be cloned from a skimmer inserted into the card reader slot that transmits the magnetic stripe account information for making a card clone, which then is used to switch transactions to magnetic stripe modes of operation for transactions with the card clone.

Still other techniques can be used to circumvent chip-based card security, such as offline attacks and/or the use of shimmers that steal the data sent over the pin locations within the card reader.

Accordingly, despite many attempts made to improved payment card security, security problems are still problematic within the industry.

SUMMARY

In various embodiments, methods and chip-based cards for chip-based card security are presented.

According to an embodiment, a method for chip-based card security is presented. An amount of resistance that is applied to a power pin location of a chip-based card is selectively removed. A voltage amount that is provided to power a chip of the chip-based card is restricted based on the amount of resistance removed from the power pin location.

DETAILED DESCRIPTION

Figure 1A:
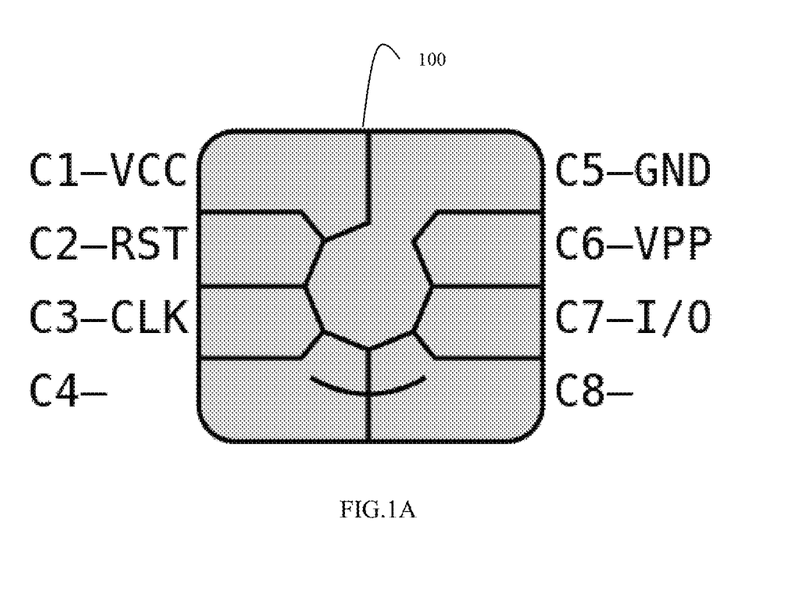
FIG. 1A is a diagram of a pin locations for a chip that is embedded within a chip-based card, according to an example embodiment.

FIG. 1A is a diagram illustrating the contact points on a chip 100 that is typically embedded in cards, according to an example embodiment.

The segmented areas of the chip 100 provide a variety of chip contact points with a card reader when a card having an embedded chip 100 is inserted into the card reader. C1 (known as VCC) provides the chip power when the chip 100 from the card makes contact inside the card reader. C2 provides contact within the reader for a reset signal. C3 provides contact within the reader for a clock signal. C4 is reserved as a contact point for future expansion. C5 provides a contact point within the reader for grounding. C6 provides a contact point within the reader for variable supply voltage (known as VPP). C7 provides a contact point within the reader for Input/Output (I/O) of information supplied to the card and supplied by the card while the card is inserted into the reader. C8 is reserved as a second contact point for future expansion and use as was C4.

Figure 1B:
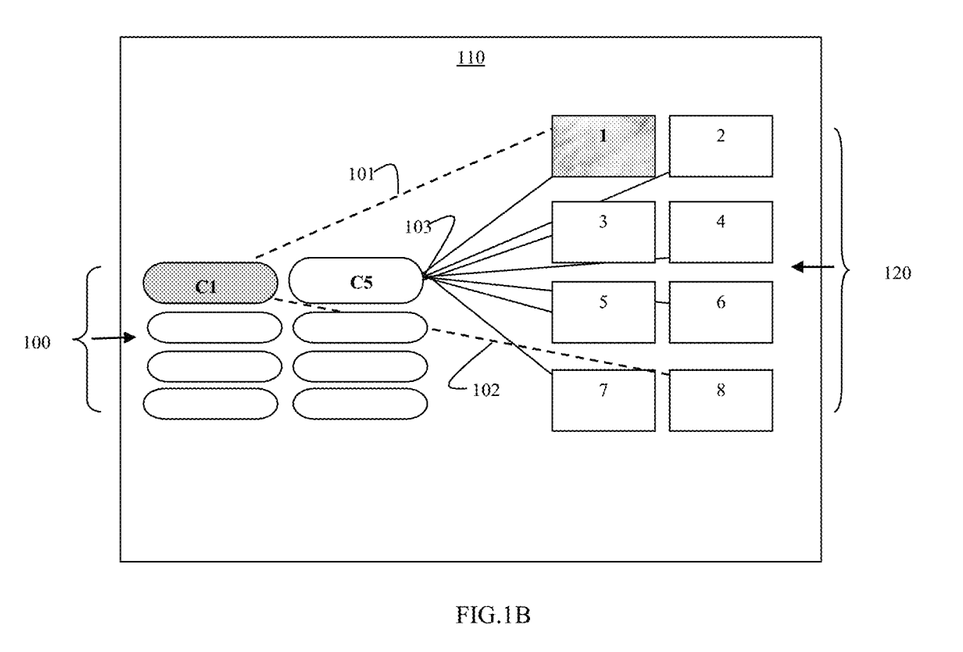
FIG. 1B is a diagram of a chip-based card with on-card security wiring activated by a single pressure point, according to an example embodiment.

FIG. 1B is a diagram of a novel chip-based card 110 with on-card security wiring activated by a single pressure point, according to an example embodiment. It is to be noted that the components are shown schematically in greatly simplified form, with only those components relevant to understanding of the embodiments being illustrated.

The card 110 includes a chip 100 a variety of pressure-sensitive contact points 120 and security wiring 101, 102, and 103. The pressure points 120 when pressed remove a resistance that is placed on the wiring 101 and 102. This can be achieved by forcing the end of the wires (behind the pressure points 120) off a resistance upon pinch, such that there is no resistance placed on C1 (power). The wires 103 make a connection to the ground C5 when their corresponding pressure points 120 are pressed, which forces a ground fault when incorrect pressure points 120 that are connected to the ground C5 are pinched.

In an embodiment, a non-conductive liquid, such as wax is inserted in an area behind customer-designated pinch points 120 (labeled as 1-8 in the FIG. 1B), the pinches break the resistance from a connection with the end of the wires 101 and 102; or force a ground connection. After a period of time sufficient for the card 110 to process a response to a challenge provided by a card reader that the card 110 is inserted into for a transaction, the end of the wires 101 and 102 move back upwardly to engage the resistances and any ground connection is broken for any pressed pressure points 120 associated with incorrect pinched points 120.

The 8 pressure or contact points 120 are custom wired with the wiring 101, 102, and 103. The illustrated pressure point 1 is wired to both C1 (power—via 101) and C5 (ground—via one of the 103s illustrated in the FIG. 1B) of the chip 100; pressure point 8 is wired to just C1 (power—via 102). Pressure points 2-7 are all wired to the ground (C5 via all but one of the 103s illustrated in the FIG. 1B).

It is to be noted that a variety of other costume wiring arrangements can be made, the configuration is based on predefined keys necessary for fully activating or partially activating the card 110 by controlling a custom amount of voltage that can be received over power pin C1 for powering on the chip 100 or the processor of the chip 100. Any incorrect key entered by pinching the power points 120 forces a ground fault when the card 110 is inserted into a card reader and supplied power. Thus, the FIGS. are intended to show a few of these keys but it should be understood that a variety of keys can be required. Furthermore, the keys can be a single pinched pressure point 120, two pinched pressure points 120, or more than two pinched power points 120.

When pressure points 120 are pressed, resistances placed on the wiring 101, 102, and 103 are removed on the corresponding pin locations for C1 and C5. This alters the voltage that can be received by pin location C1 of the chip, such that in a normal state (non-pressed pressure points 120), the chip 100 is fully in a resisted state and is unable to power on via C1 from the card reader, as a result, the card 110 will be rejected as an invalid card when inserted into the card reader because the firmware on the chip 100 that produces a response to a challenge will not be executed by the chip 100.

When one or more desired pinch points 120 are pressed, resistance is removed and the card 110 is capable of being fully powered at about approximately 4 volts or only partially powered at about approximate 1.2 volts. The voltage level that powers the chip 100 alters the math operations or capabilities of the firmware that executes on the chip 100. So, the processor of the chip 100 is either partially powered on via C1 or fully powered on via C1. At lower voltages, such as 1.2 volts the firmware may only be able to provide a primary account number (PAN) for the card holder of the card 110.

Figure 1C:
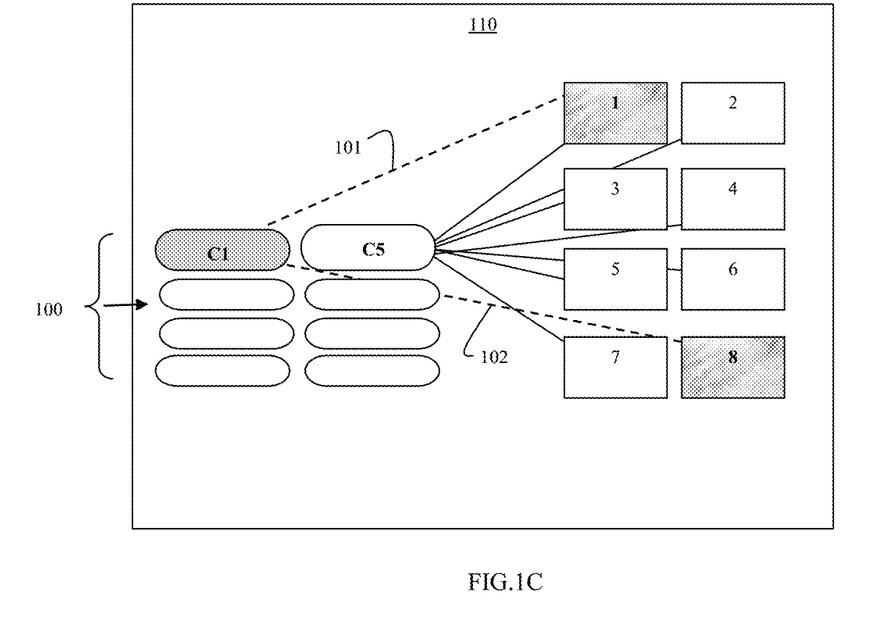
FIG. 1C is a diagram of a chip-based card with on-card security wiring activated by multiple pressure points, according to an example embodiment.

The FIG. 1C is a diagram of a chip-based card 110 with on-card security wiring activated by multiple pressure points, according to an example embodiment. The customized wiring 101, 102, and 103 shown in the FIG. 1C illustrates that two pressure points (labeled 1 and 8) have to be pinched to remove all resistance placed on C1.

The FIG. 1B illustrated a single pressure point (labeled 1) when pinched permitted full power to be received by the C1 pin location on the card 110 from a card reader; whereas to remove all resistance and for the card to receive full power in the FIG. 1C two pressure points (labeled 1 and 8) are pinched.

Figure 1D:
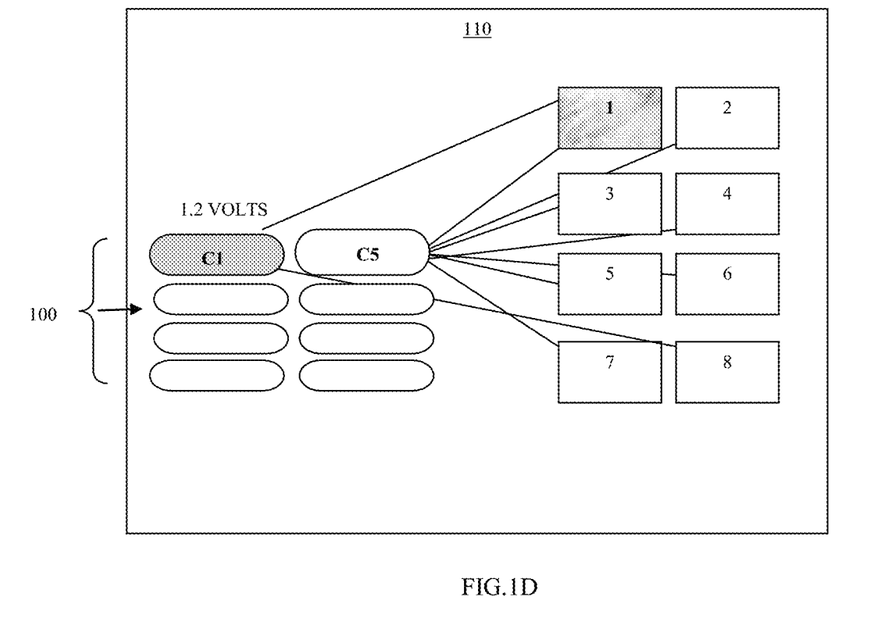
FIG. 1D is a diagram of a chip-based card with on-card security wiring that only partially activates the chip from a single pressure point, according to an example embodiment.

The FIG. 1D is a diagram of a chip-based card 110 with on-card security wiring that only partially activates the chip from a single pressure point, according to an example embodiment.

In the FIG. 1D the card 110 is custom-wired such that a minimal amount of power is capable of being received when a single pressure point (labeled 1) is pinched by the card holder. The partial activation provides a minimal of approximately 1.2 volts that the chip 100 can use through the power supplied by the card reader through C1 pin location.

Figure 1E:
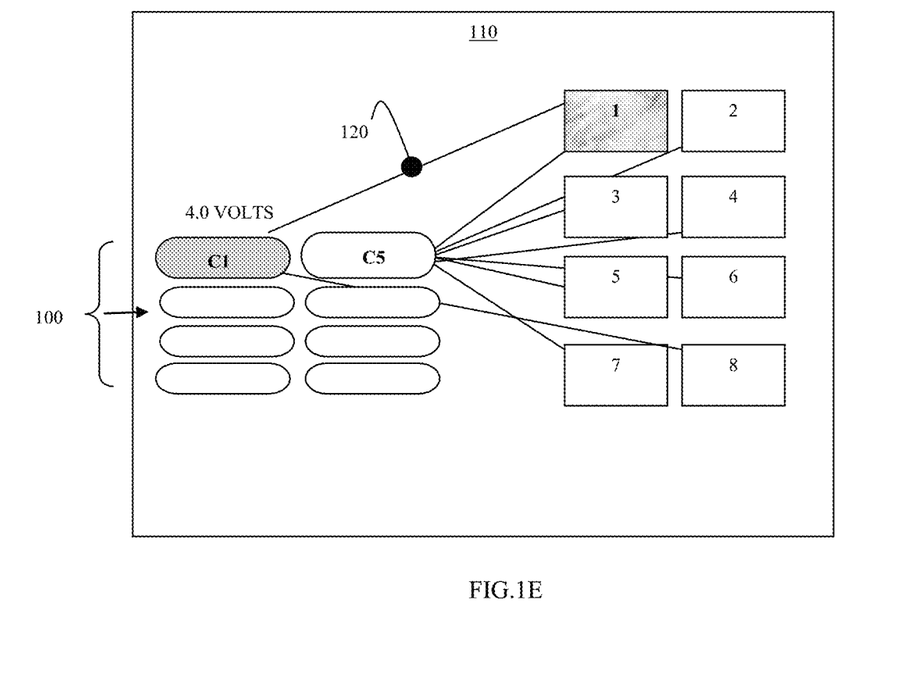
FIG. 1E is a diagram of a chip-based card with on-card security wiring that fully activates the chip utilizing a single pressure point, according to an example embodiment.

The FIG. 1E is a diagram of a chip-based card 110 with on-card security wiring that fully activates the chip utilizing a single pressure point, according to an example embodiment.

In the FIG. 1E all resistance placed on C1 of the chip 100 is removed upon pinching a single pressure point (labeled as 1). The processor is capable of being fully powered through C1 by the card reader and all features of the firmware that executes the firmware is available for transaction processing at a transaction terminal.

As noted above, it may be to remove all resistance on C1 multiple customized pressure points (two of any of the 8 labeled within 120) have to be pinched by the card holder prior to insertion into the card reader.

The card 110 is custom wired, such that pinching one, two, or more pressure points 120 produce a desired voltage (full voltage, minimal voltage, or a range of voltage between the minimum voltages to the full voltage—the range approximately a custom voltage between 1.2 volts to 4.0 volts).

Figure 1F:
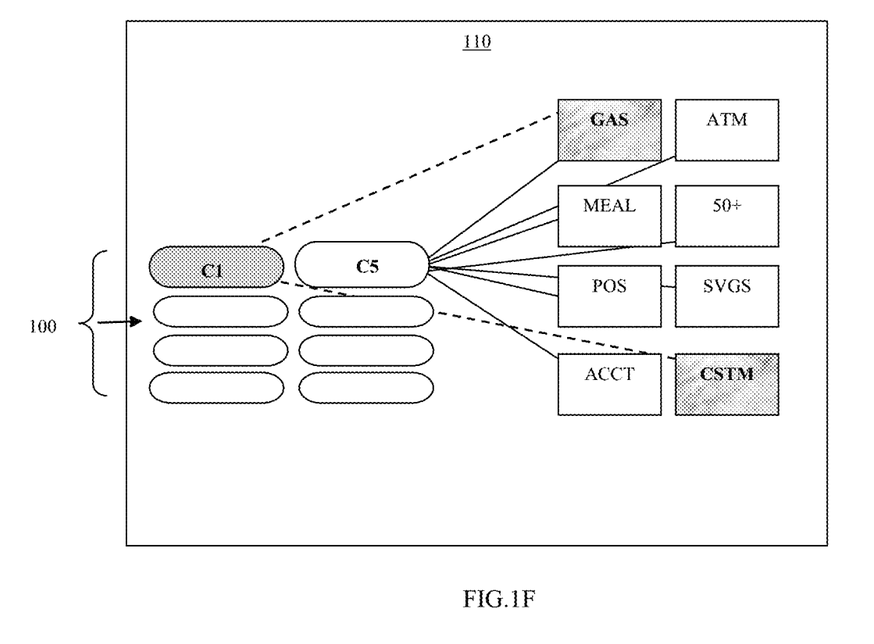
FIG. 1F is a diagram of a chip-based card with on-card security wiring that custom activates the chip based on a type of transaction being conducted utilizing pressure points, according to an example embodiment.

The FIG. 1F is a diagram of a chip-based card 110 with on-card security wiring that custom activates the chip based on a type of transaction being conducted utilizing pressure points, according to an example embodiment.

The pressure points 120 include text or image-based indicia on the front surface of the card 110. As stated before, when 1, 2, or a custom number of pressure points 120 are pinched (based on the customized wiring 101, 102, and 103) for the card 110, the voltage that is permitted over C1 to power the processor of the chip 100 varies. This in turn varies what is produced as output by the chip 100 and returned over C7 to the card reader.

The custom voltage can be used as a determination as to what type of transaction that the user is performing with a transaction terminal, such as paying for gas, transaction at an ATM, purchasing a meal, transacting for something that exceeds $50, transacting with a POS terminal, accessing savings account, accessing a different account, and the like. The type of transaction determined from the voltage can then be used to customize the output produced by the chip 100. For example, if the card holder pinches ATM and inserts the card 110 into a gas pump kiosk, the output produced by the firmware of the chip 100 will not be in a recognized format that the gas pump is expecting to see and the gas pump will reject the transaction as an invalid card.

This indicia-based pressure points 120 may also be used to determine a PAN, such that the card 110 can include multiple verifications of transactions for different cards that the user may have. So, when ATM is pinched, the firmware uses the user's bank account, but when gas is pinched a credit card account for the user is used. In this way, multiple accounts of the user can be managed on the single card 110.

The card 110 provides for customized wiring 101, 102, and 103 between pressure points 120 and pin locations C1 (power) and C5 (ground) of the chip 100 that is embedded in the card 110. Behind the pressure points (end of wiring 101, 102, and 103) is a resistance placed on the wires 101, 102, and 103. When the card holder presses a single correct pressure point, two correct pressure points, or more than two correct pressure points, the resistances are custom removed off the ends of the appropriate wires 101, 102, and 103. Removal of the resistance allows the chip 100 to receive a range of custom voltage from the card reader, each range of voltage can then produce a custom output by the firmware that executes on the processor of the chip 100.

This provides for on-card security, such that transaction processing that the card 110 is capable of performing is controlled by the user through the custom pinch or custom pinches on the correct pressure point(s) 120. No changes need to be made to the card readers and/or transaction terminals to utilize the card 110 for transactions. The cards 110 control the security. This pressure-based security on the card 110 also prevents relay attacks because the card 110 would be unable to return a correct output for the bogus transaction when it was not first activated for such transaction by the user through pinching the proper pressure points 120. The card 110 would also be useless to a thief that steals the card 110 because the thief would have to know the correct pressure points 120 before being able to use the card 110.

Moreover, if an incorrect pressure point 120 is pressed prior to the card 110 being inserted into the card reader, the ground pin C5 of the chip 100 generates a ground fault that prevents the chip 100 from receiving power from the card reader through the power pin C1. In this way, a thief that steals the card 110 would continuously cause a ground fault each time an incorrect pressure point 120 was pressed. This also prevents the thief from pinching all the pressure points 120 in an effort to power the chip 100 on.

In an embodiment, the card 110 is a modified and enhanced EMV-compliant card. In an embodiment, the pressure points 120 are used in place of any existing Personal Identification Number (PIN) required for entry at the card reader during a transaction. That is, the PIN can be provided through the customized and user-directed pinches on the pressure points 120 prior to insertion of the card 110 into a card reader. In an embodiment, the user-directed pinches are done prior to card 110 insertion and the user still enters a required PIN on the PIN pad of the card reader for the transaction to proceed.

In an embodiment, there can be any number of pressure points 120 on the card 110, such as 2, 3, 4, 5, 6, or 7.

In an embodiment, there is no indicia printed or imaged on any of the pressure points 120. In an embodiment, only select ones of available pressure points 120 are identified with indicia printed or imaged on those pressure points 120, where remaining ones of the pressure points include no indicia associated therewith (this may provide for added security by intentionally not labeling some pressure points 120 to obscure the importance of such pressure points 120 from any thief that may usurp the card 110 from the card holder). In an embodiment, the card holder can custom provide the indicia for the pressure points 120 before the card 110 is manufactured and delivered to the cold holder.

As used herein "on-card" security is intended to mean that the chip-based card 110 controls and is configured with security features before the chip 110 on the card 110 is powered on by a chip-based card reader. That is, the security for the card 110 is built into electromechanical componentry of the card 110, which can be user-configured and user-changed through custom pinches on the pressure points 120 prior to insertion into a card reader for transaction processing.

These and other embodiments are now discussed with reference to the FIGS. 2-3.

Figure 2:
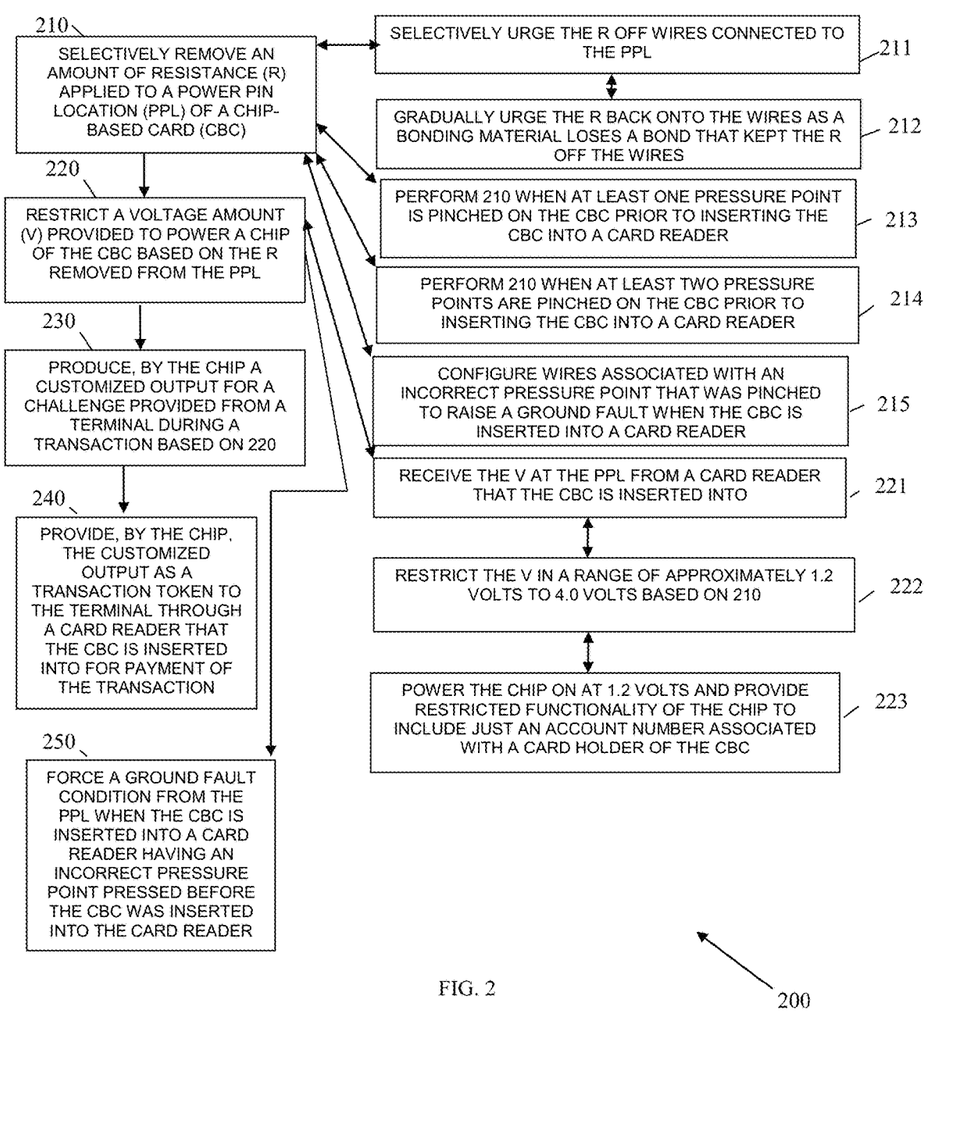
FIG. 2 is a diagram of a method for chip-based card security processing, according to an example embodiment.

FIG. 2 is a diagram of a method 200 for chip-based card security processing, according to an example embodiment.

The chip-based card 110 is electromechanically structured in the manners discussed above with the FIGS. 1A-1F. When pressure or presses/pinches are made to the structure of the card 110, the steps of the action are performed as noted below. Some steps entail execution of firmware by the chip/processor embedded in the card 110.

At 210, a card holder selectively pinches a correct number of and correct selections from the pressure points 120. The correct number and correct selections from the pressure points 120 represent a user-defined or card-issuer defined security personal identification number (PIN) or a transaction type specific transaction authorization code. Responsive to the pinches, the card 110 selectively removes an amount of resistance that is to be applied to a power pin location (C1) on the chip 100.

In an embodiment, at 211, resistors are selectively urged off wires that are connected to the power pin location (C1). That is under corresponding pressure points resistors are urged to detach from the wires, such that wires between the power pin and the corresponding pressure points encounter no resistance when power is supplied to the power pin from a card reader. In its natural state, the resistors are on the wires and the card 110 is incapable of being powered on from the card reader through the power pin.

In an embodiment of 211 and at 212, the amount of resistance is gradually urged back onto the wires as a bonding material loses a bond that kept the resistors off the wires.

In an embodiment, at 213, the selective removing, 210, is performed when at least one correct and pre-wired pressure point is pinched on the card 110 prior to insertion of the card into a card reader.

In an embodiment, at 214, the selective removing, at 210, is performed when at least two pressure points are pinched on the card 110 prior to insertion of the card into a card reader.

In an embodiment, at 215, the wires are configured such that if an incorrectly pinched pressure point is made on the card 110 prior to the card 110 being inserted into a card reader, then the wire connections made by the incorrect pinch will generate a ground fault at C5 pin location and prevent the chip 100 from being powered on.

At 220, a voltage amount is restricted such that a custom level of power is provided to the chip 100 based on the selective removal of the resistance at 210. That is, the chip 100 is either fully powered, minimally powered, not powered at all, or powered somewhere in between minimum power and full power.

In an embodiment, at 221, the voltage amount is received at the power pin location (C1) from a card reader that the card 110 is inserted into.

In an embodiment of 221 and at 222, the voltage amount is restricted in a range of approximately 1.2 volts to 4.0 volts.

In an embodiment of 222 and at 223, the chip is powered on at the 1.2 volts and functionality provided by the minimally powered processor of the chip is restricted to just include an account number associated with a card holder of the card 110.

In an embodiment, at 230, the firmware that is executed by the processor of the chip 100 produces a customized output for a challenge provided from a transaction terminal during a transaction based on 220.

In an embodiment of 230 and at 240, the firmware provides the customized output as a transaction token to the terminal through a card reader that the card 110 is inserted into for payment of a transaction.

In an embodiment, at 250, a ground fault condition is forced from the power pin location (C1) when the card 110 is inserted into a card reader while having at least one incorrect pressure point pinched before the card 110 was inserted into the card reader.

Figure 3:
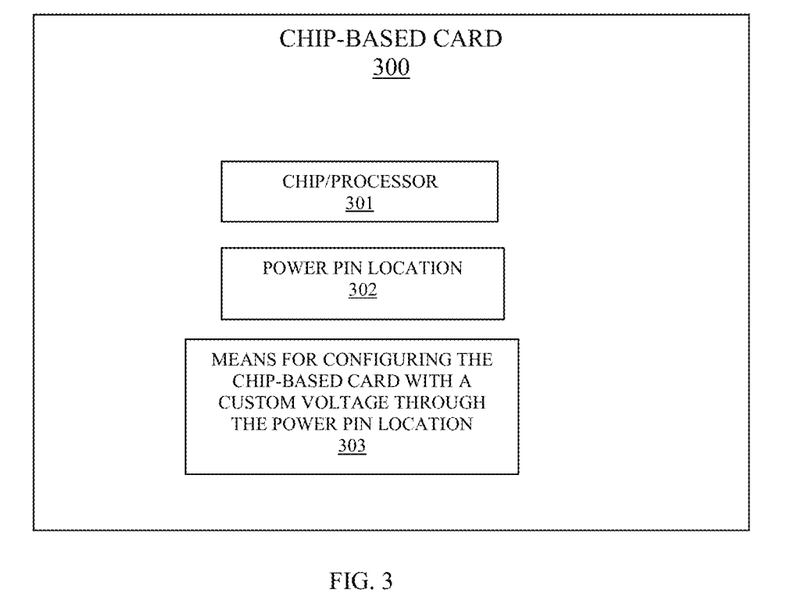
FIG. 3 is a diagram of yet another chip-based card with on-card security, according to an example embodiment.

FIG. 3 is a diagram of a chip-based card 300, according to an example embodiment. The card 300 includes a variety of hardware components and software components (firmware). The firmware of the card 300 is programmed and reside within memory and/or a non-transitory computer-readable medium and execute on the chip/processor 301 of the card 300. The card 300 is powered through one or more pin locations of the chip by a chip-based card reader.

In an embodiment, the card 300 is any of the cards 110 discussed above with the FIGS. 1A-1F and 2.

The card 300 includes a chip/processor 301, a power pin location 302, and a means 303 for configuring the card 300 with a custom voltage through the power pin location 302.

The chip/processor 301 is configured to generate a unique code based on an amount of voltage supplied to the chip 301 by a card reader. That is, firmware executes on the processor 301 based on the amount of voltage provided for powering the processor 301 on.

The power pin location 302 is configured to receive card-reader supplied voltage from the card reader when the card 300 is inserted into the card reader. The power pin location is further configured to provide the amount of voltage to the chip.

The means for 303 is for configuring resistance that is to be applied against the power pin location to achieve the amount of voltage from the card-reader supplied voltage.

In an embodiment, the means 303 is any of the custom wiring combined with the resistances that are removed from the custom wiring responsive to pinches made on the pressure points 120 by the card holder prior to inserting the card 300 into a chip-based card reader for a transaction, as discussed above with the FIGS. 1A-1F and 2.

In an embodiment, the means 303 is a plurality of pressure points 120 on a front surface of the card that when pinched are configured to remove a custom-amount of the resistance applied at the power pin location 302.

In an embodiment, the card 300 is a modified and enhanced EMV-compliant card for performing transactions at a transaction terminal.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
selectively removing an amount of resistance applied to a power pin location of a chip-based card;
restricting a voltage amount provided to power a chip of the chip-based card based on the amount of resistance removed from the power pin location; and
providing, by the chip, the customized output as a transaction token to the terminal through a card reader that the chip-based card is inserted into for payment of the transaction.

2. The method of claim 1 further comprising, producing, by the chip, a customized output for a challenge provided from a terminal during a transaction based on the restricting.

3. The method of claim 1, wherein selectively removing further includes selectively urging the amount of resistance off wires connected to the power pin location.

4. The method of claim 3, wherein selectively urging further includes gradually urging the amount of resistance back onto the wires as a bonding material loses a bond that kept the amount of resistance off the wires.

5. The method of claim 1, wherein selectively removing further includes performing the selectively removing when at least one pressure point is pinched on the chip-based card prior to inserting the chip-based card into a card reader.

6. The method of claim 1, wherein selectively removing further includes performing the selectively removing when at least two pressure points are pinched on the chip-based card prior to inserting the chip-based card into a card reader.

7. The method of claim 1, wherein selectively removing further includes configuring wires associated with an incorrect pressure point that was pinched to raise a ground fault when the chip-based card is inserted into a card reader.

8. The method of claim 1, wherein restricting further includes receiving the voltage amount at the power pin location from a card reader that the chip-based card is inserted into.

9. The method of claim 8, wherein receiving further includes restricting the voltage amount in a range of approximately 1.2 volts to 4.0 volts.

10. The method of claim 9, wherein restricting further includes powering the chip on at 1.2 volts and providing restricted functionality of the chip to include just an account number associated with a card holder of the chip-based card.

11. A chip-based card, comprising:
a chip;
a plurality of pressure points on a front surface of the chip-based card configured to be pinched;
at least one power wire located under at least one of the pressure points on a first end and connected to a power pin of the chip on a second end;
a plurality of ground wires, each ground wire located under a unique one of pressure points at a first end and each ground wire connected to a ground pin of the chip on a second end; and at least one resistor attached to the first end of the at least one power wire;

wherein the at least one resistor is configure to detach from the second end of the at least one power wire when the corresponding pressure point is pinched to achieve a custom voltage at the power pin when the chip-based card is inserted into a card reader with the chip powered on at the custom voltage.

12. The chip-based card of claim 11, wherein the plurality of pressure points is 8 pressure points.

13. The chip-based card of claim 11, wherein the at least one power wire is one of: 1 power wire and 2 power wires.

14. The chip-based card of claim 13, wherein when the at least one power wire is the 2 power wires, the at least one resistor is 2 resistors and the two corresponding pressure points have to both be pinched to detach the 2 resistors and to fully power the chip on at a maximum voltage available from the card reader.

15. The chip-based card of claim 11, wherein when a particular pressure point is pinched that lacks the at least one power wire, the power pin is configured to raise a ground fault when the chip-based card is supplied power from the card reader that prevents the chip from being powered on.

16. The chip-based card of claim 11, wherein the at least one resistor is configured to reattach to the second end of the at least one power wire when as a bonding agent that separates the at least one resister from the second end of the at least one power wire gradually wears off after the corresponding pressure point was pinched.

17. A chip-based card, comprising:

a chip configured to generate a unique code based on an amount of voltage supplied to the chip by a card reader;

a power pin location configured to obtain a card-reader supplied voltage from the card reader and provide the amount of voltage to the chip; and a plurality of pressure points on a front surface of the card that when pinched are configured to remove a custom-amount of resistance applied at the power pin location;

wherein a ground fault condition is forced from the power pin location when the chip-based card is inserted into the card reader with an incorrect pressure point pressed before the chip-based card was inserted into the card reader.

* * * * *